Dec. 17, 1963  G. P. SMITH  3,114,319
NOSE CONE OR RADOME CONSTRUCTION
Filed May 10, 1962
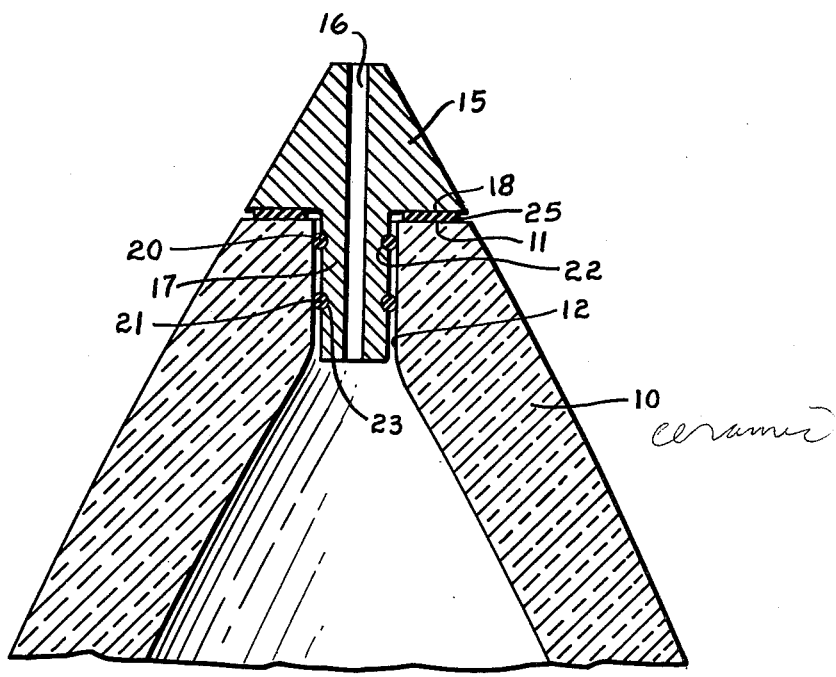
INVENTOR.
GAIL P. SMITH
BY
Clarence R. Patty
ATTORNEY United States Patent Office 3,114,319
Patented Dec. 17, 1963

3,114,319
NOSE CONE OR RADOME CONSTRUCTION
Gail P. Smith, Corning, N.Y., assignor to Corning Glass Works, Corning, N.Y., a corporation of New York
Filed May 10, 1962, Ser. No. 193,708
10 Claims. (Cl. 102—92.5)

This invention relates to novel construction of a generally conical or ogive shaped, thin walled ceramic nose cones or radomes for rockets and missiles. In particular, the invention relates to a novel means of attaching a metal tip to a truncated apex of these ceramic nose cones or radomes.

Nose cones or radomes, of the type to which the invention pertains, conventionally comprise a generally conical or ogive shaped, thin walled, hollow, ceramic body of revolution. They are commonly made of a highly refractory and strong ceramic material that is capable of withstanding aerodynamic stresses and heating effects. The material for radome bodies, in particular, must also be transparent to the radar frequencies. Usually the bodies are made of alumina, zirconia or a glass-ceramic material (i.e. a glass that is substantially crystallized by heat treatment), such as that disclosed in United States Patent 2,920,971 to Stookey.

For certain applications, it has been found necessary to provide an axial opening in the apex of the thin walled, conical ceramic body for a Pitot tube, which is connected to ram jet pressure measuring instruments inside the body of the missile or rocket. In order to provide suitable means for fixedly attaching the outer end of the Pitot tube to the axial opening, the conical ceramic body was provided with a truncated apex with the central or axial bore opening therein. On top of the truncated apex was positioned a conically shaped metal tip having an external conical surface forming a substantially smooth continuous surface with the external conical surface of the ceramic body. The metal tip was provided with a cylindrical portion extending into the axial bore in the ceramic body and having an outside diameter slightly smaller than the diameter of the bore. The metal tip was also provided with an axial bore extending therethrough from its apex to the lower end of the cylindrical portion. The free end of the tube or hose connected to the pressure measuring instruments was then suitably attached to the lower end of the extending cylindrical portion of the metal tip.

While the foregoing construction provides a very suitable means for positioning and holding the outer end of the Pitot tube in communication with the atmospheric pressure at the apex of the nose cone or radome, considerable difficulty was encountered in providing suitable and economical means for fixedly attaching the metal tip to the adjacent ceramic surfaces. It was found that it was not possible to use the conventional techniques of bonding or cementing together the adjacent metal and ceramic surfaces with substantially rigid sealing materials. This included bonding materials like hardenable epoxy resins as well as more conventional fused ceramic sealing materials for joining metal to ceramic.

The problem of attaching the metal tip to the ceramic body arises from two basic and differing characteristics of ceramic and metal. The first, and probably most important characteristic is that of thermal conductivity. Metals have relatively high thermal conductivity while ceramics have relatively low thermal conductivity. The second characteristic is the coefficients of thermal expansion; metals generally have higher coefficients of thermal expansion than ceramics. Under conditions of rapid temperature increase at the external surfaces of a radome or nose cone, as occurs in flight due to aerodynamic heating effects, it is found that the cylindrical metal portion within the axial bore of the ceramic body becomes very much hotter than the surrounding ceramic walls because of the differing thermal conductivity characteristics. As a result of this situation, the cylindrical metal portion expands radially much more and faster than the surrounding ceramic wall. Thus, a substantially rigid bonding layer affords no allowance for this differential expansion and this produces a severe stress in the thin surrounding ceramic wall resulting in fracture or bursting of the ceramic body.

I have now discovered that the foregoing problems and difficulties can be overcome by providing a plurality of axially spaced, annular, resilient members, rings or washers disposed between and in concurrent frictional engagement with concentrically spaced surfaces of the cylindrical metal portion and the bore wall of the ceramic body. As the cylindrical metal portion expands upon being heated, the resilient members, rings or washers are readily compressed radially, but they can expand axially along the bore within the concentric spacing. The concentric spacing and the spacing between resilient members are made sufficiently large so that the resilient members are never tightly pressed against the ceramic walls of the bore under the most unfavorable combination of manufacturing tolerances of the parts and service heating conditions causing greater radial expansion of the cylindrical metal portion relative to the ceramic wall of the bore.

Thus, it is an object of this invention to provide a nose cone or radome construction having the above described ceramic body and metal tip attached together by means that will hold the two parts together while simultaneously allowing greater radial expansion of the cylindrical metal portion relative to the surrounding ceramic wall when the nose cone or radome is subjected to rapid heating at its external surfaces and without causing damage or fracture of the ceramic body.

It is another object of this invention to provide a nose cone or radome construction having means of attaching together the above described ceramic body and metal tip that allows extremely easy, quick and inexpensive assembly of the parts.

Additional objects, features and advantages of the present invention will be apparent, to those skilled in the art, from the following detailed description and the attached drawing in which, by way of example, only the preferred embodiments of this invention are illustrated.

The sole FIGURE of the drawing shows an enlarged, fragmentary, longitudinal, cross-sectional view of a radome or nose construction according to this invention.

Referring now to the drawing, a generally conical or ogive shaped, thin walled, hollow, ceramic body of revolution 10 has a truncated apex 11 and a cylindrical axial or central opening in the apex portion defined by internal wall 12. Disposed on the truncated apex 11 is a conically shaped tip 15 made of an oxidation resistant metal or alloy, for example, stainless steel. The tip 15 has an axial bore therethrough defined by cylindrical wall 16. Additionally, the tip 15 is provided with an annular portion 17 axially extending from the base 18 and is situated within the axial opening in the ceramic body 10, as defined by wall 12. The outside diameter of portion 17 is made small enough to provide a substantial concentric spacing between wall 12 and the outside circumferential surface of portion 17.

As the means of attaching tip 15 to the ceramic body 10, resilient washers or O-rings 20 and 21 are suitably positioned in axially spaced relation on portion 17 prior to being inserted into the axial bore defined by wall 12. Preferably, portion 17 is provided with axially spaced, annular grooves 22 and 23 on its outside circumferential surface into which the O-rings 20 and 21 are positioned. Such grooves should be shallow enough so that a substantial portion of the O-rings 20 and 21 protrude outwardly beyond the outer circumferential surface of portion 17. The positioned O-rings 20 and 21 have a normal, uncompressed outside annular diameter slightly larger than the diameter of wall 12 so that, as portion 17 is inserted in the bore 12, the O-rings 20 and 21 will be somewhat compressed between portion 17 and wall 12. Thus, the O-rings 20 and 21 frictionally and resiliently engage the wall 12 and portion 17 thereby holding tip 15 on the ceramic body 10 with the base 18 confronting the truncated apex 11.

Preferably, the O-rings should be made of a temperature resistant material, such as a silicone rubber (e.g. Compound SE751—Class 700, sold by Plastic & Rubber Products Co., Los Angeles, California). However, any rubber or like resilient material can be used, especially where the missile or rocket will be destroyed upon reaching its target or destination. In the latter situation, it is not objectionable if the resilient material is partly or whloly destroyed by high temperature developed in flight because at that point the aerodynamic pressure on the metal tip will usually be sufficient to hold it in place.

As previously stated, the concentric spacing between wall 12 and portion 17, and the spacing between resilient members or O-rings 20 and 21 are made sufficiently large so that the resilient members are never tightly pressed against the wall 12 during flight to avoid causing bursting stresses in the thin walls of ceramic body 10. These spaces can readily be determined by those skilled in the art for any particular combination of ceramic, metal and resilient materials used for the novel construction of this invention.

By way of illustration, the following is a specific example of the invention. The body 10 is made of the glass-ceramic material shown in Example 1 of the aforementioned Stookey Patent 2,920,971. The metal tip 15 is made of A.I.S.I. Type No. 310 stainless steel containing nominally 25% chromium and 20% nickel. The O-rings 20 and 21 are made of the aforementioned Compound SE751—Class 700. Portion 17 has an outside diameter of 9/32 inch. The two annular grooves 22 and 23 have a depth of about 1/64 inch and are axially spaced by a distance of about 1/4 inch. The O-rings 20 and 21 have an outer annular diameter of 3/8 inch and a cross-sectional diameter of 1/16". The diameter of the bore, defined by wall 12, is made slightly smaller than 3/8 inch to provide a concentric spacing between wall 12 and portion 17 of about 0.045 inch at room temperature. Thus, there is provided a means of attaching the metal tip 15 to the ceramic body 10 and having a resilient character that allows greater radial expansion of portion 17 relative to wall 12 without causing detrimental bursting stresses in the ceramic body 10.

As shown in the preferred embodiment in the drawing, it is desirable to insert a flat annular washer 25, suitably made of the same material as the O-rings, between the base 18 and truncated apex 11 to provide a better seal and thermal insulation therebetween, particularly when the ceramic body 10 is made of a glass-ceramic material.

It should be understood that the term "metal," as used in this specification and in the appended claims, is means to include alloys as well as substantially elemental metals that are suitable for service under aerodynamic heating conditions, either with or without external refractory coatings. Also, the term "ceramic" is intended to include sintered or fused crystalline ceramic materials and glass-ceramic materials that are suitable for use as nose cone or radome bodies.

Although the present invention has been described with respect to specific details of certain embodiments thereof, it is not intended that such details be limitations upon the scope of the invention except insofar as set forth in the following claims.

What is claimed is:

1. A nose cone comprising a generally conical shaped, thin walled, hollow, ceramic body of revolution having a truncated apex with an axial bore opening therein, a concially shaped metal tip disposed on said truncated apex, said metal having a thermal conductivity higher than that of said ceramic, the external conical surface of said tip forming a substantially smooth continuous surface with the external generally conical surface of said ceramic body, said tip having a cylindrical portion extending axially into and concentrically spaced from the wall of said axial bore, a plurality of axially spaced, annular, resilient members disposed between and in concurrent frictional engagement with said cylindrical portion and the wall of said axial bore, said axial bore, said cylindrical portion and said resilient members so constructed and arranged with said concentric and axial spacings that said cylindrical portion is free to radially expand greater than said bore wall while said resilient members are simultaneously free to expand axially of said bore within said concentric spacing without being tightly compressed against said bore wall to cause fracture of said ceramic body.

2. The nose cone of claim 1 wherein the said cylindrical portion is provided with a plurality of axially spaced, shallow, annular grooves on the external cylindrical surface thereof and said resilient members are positioned in said grooves.

3. The nose cone of claim 1 wherein the said resilient members are rubber O-rings.

4. The nose cone of claim 3 wherein the said rubber O-rings are made of a silicone rubber.

5. A radome comprising an ogive shaped, thin walled, hollow, ceramic body of revolution having a truncated apex with an axial bore opening therein, a conically shaped metal tip disposed on said truncated apex, said metal having a thermal conductivity higher than that of said ceramic, the external conical surface of said tip forming a substantially smooth continuous surface with the external ogive surface of said ceramic body, said tip having a cylindrical portion extending axially into and concentrically spaced from the wall of said axial bore, a plurality of axially spaced, annular, resilient members disposed between and in concurrent frictional engagement with said cylindrical portion and the wall of said axial bore, said axial bore, said cylindrical portion and said resilient members so constructed and arranged with said concentric and axial spacings that said cylindrical portion is free to radially expand greater than said bore wall while said resilient members are simultaneously free to expand axially of said bore within said concentric spacing without being tightly compressed against said bore wall to cause fracture of said ceramic body.

6. The radome of claim 5 wherein the said cylindrical portion is provided with a plurality of axially spaced, shallow, annular grooves on the external cylindrical surface thereof and said resilient members are positioned in said grooves.

7. The radome of claim 5 wherein the said resilient members are rubber O-rings.

8. The radome of claim 7 wherein the said rubber O-rings are made of a silicone rubber.

9. The radome of claim 8 wherein the said cylindrical portion is provided with a plurality of axially spaced, annular, shallow grooves on the external cylindrical surface thereof and said silicone rubber O-rings are positioned in said grooves.

10. The radome of claim 5 wherein a flat, annular, resilient member is disposed between the surface of said truncated apex and the confronting surface of said metal tip.

References Cited in the file of this patent

UNITED STATES PATENTS

| 1,227,720 | Wilhelm et al. | May 29, 1917 |
| 1,435,773 | Wilhelmi | Nov. 14, 1922 |
| 2,708,408 | Sweetman | May 17, 1955 |
| 2,994,269 | Schlumberger | Aug. 1, 1961 |
| 3,016,014 | Lebourg | Jan. 9, 1962 |

FOREIGN PATENTS

| 782,335 | Great Britain | Sept. 4, 1957 |